US009934306B2

(12) United States Patent
Subramanian et al.

(10) Patent No.: US 9,934,306 B2
(45) Date of Patent: Apr. 3, 2018

(54) IDENTIFYING QUERY INTENT (71) Applicant: Microsoft Technology Licensing, LLC, Redmond, WA (US)

(72) Inventors: Meyyammai Subramanian, Redmond, WA (US); Sayed Hassan, Giza (EG); Anneliese Creighton Wirth, Seattle, WA (US); Michelle Follosco Valeriano, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 14/275,155

(22) Filed: May 12, 2014

(65) Prior Publication Data

US 2015/0324440 A1  Nov. 12, 2015

(51) Int. Cl.
G06F 17/30 (2006.01)
G06F 9/44 (2018.01)

(52) U.S. Cl.
CPC ...... *G06F 17/30598* (2013.01); *G06F 9/4446* (2013.01); *G06F 17/3043* (2013.01);
(Continued)

(58) Field of Classification Search
CPC .............. G06F 17/273; G06F 17/2785; G06F 17/30684; G06F 17/271; G06F 17/2795; G06F 17/27; G06F 17/277; G06F 17/2775; G06F 17/28; G06F 17/30401; G06F 17/3043; G06F 17/30598; G06F 17/3061; G06F 17/30663; G06F 17/30672; G06F 17/30731; Y10S 707/99933; G06N 5/02; G06N 99/005

USPC ...... 704/10, 257, 9, E15.005, 1, 270, 4; 1/1; 715/257, 256, 260, 271; 707/740, 741, 707/748, 771, 999.005, 999.006
See application file for complete search history.

(56) References Cited

U.S. PATENT DOCUMENTS 5,203,705 A * 4/1993 Hardy ................ A63F 3/0421
434/167
5,255,386 A  10/1993 Prager
(Continued)

FOREIGN PATENT DOCUMENTS

EP  1643390 A1  4/2006
WO  WO0210980 A1  2/2002

OTHER PUBLICATIONS

Beeferman, "Agglomerative Clustering of a Search Engine Query Log", Proceedings of the ACM SIGKDD. International Conference on Knowledge Discovery and Data Mining, ACM: Jan. 1, 2000, 10 pgs.

(Continued)

*Primary Examiner* — Dennis Truong
(74) *Attorney, Agent, or Firm* — Michael Best & Friedrich LLP (57) ABSTRACT

Technologies are described herein for identifying query intent from a raw query. A method for identifying intent may include repeatedly separating and merging terms of a natural language expression based on a set of rule-based transpositions of natural language terms into one or more defined terms based on predetermined naming conventions for at least one software function. Thereafter, a cluster of previous search terms related to the defined terms may be identified, and the natural language expression may be associated with the identified cluster to create intent-based cluster information.

19 Claims, 8 Drawing Sheets

(52) U.S. Cl.
CPC .. *G06F 17/30507* (2013.01); *G06F 17/30672* (2013.01); *G06F 17/30864* (2013.01)

(56) References Cited

U.S. PATENT DOCUMENTS

| | | | |
|---|---|---|---|
| 5,659,771 A * | 8/1997 | Golding | G06F 17/273 715/257 |
| 5,963,940 A | 10/1999 | Liddy et al. | |
| 6,038,560 A | 3/2000 | Wical | |
| 6,601,059 B1 | 7/2003 | Fries | |
| 6,675,159 B1 | 1/2004 | Lin et al. | |
| 6,766,320 B1 | 7/2004 | Wang et al. | |
| 7,194,684 B1 | 3/2007 | Shazeer | |
| 7,840,538 B2 | 11/2010 | Joshi et al. | |
| 8,051,374 B1 * | 11/2011 | Shazeer | G06F 17/273 715/257 |
| 8,082,264 B2 | 12/2011 | Bierner | |
| 8,321,201 B1 * | 11/2012 | Baker | G06F 17/2795 704/1 |
| 8,478,780 B2 | 7/2013 | Cooper et al. | |
| 9,213,687 B2 * | 12/2015 | Au | G06F 17/27 |
| 2002/0123994 A1 * | 9/2002 | Schabes | G06F 17/3061 |
| 2002/0156816 A1 * | 10/2002 | Kantrowitz | G06F 17/273 715/256 |
| 2003/0233224 A1 * | 12/2003 | Marchisio | G06F 17/271 704/4 |
| 2005/0108001 A1 * | 5/2005 | Aarskog | G06F 17/271 704/10 |
| 2005/0283363 A1 * | 12/2005 | Weng | G10L 15/1822 704/257 |
| 2006/0136455 A1 | 6/2006 | Wen et al. | |
| 2007/0106499 A1 * | 5/2007 | Dahlgren | G06F 17/30401 704/10 |
| 2008/0091408 A1 * | 4/2008 | Roulland | G06F 17/30672 704/9 |
| 2008/0104071 A1 * | 5/2008 | Pragada | G06F 17/3043 |
| 2008/0221893 A1 * | 9/2008 | Kaiser | G10L 15/24 704/257 |
| 2009/0077047 A1 * | 3/2009 | Cooper | G06F 17/2785 |
| 2009/0094221 A1 | 4/2009 | Cameron et al. | |
| 2010/0070448 A1 * | 3/2010 | Omoigui | H01L 27/1463 706/47 |
| 2011/0087670 A1 | 4/2011 | Jorstad et al. | |
| 2011/0301941 A1 * | 12/2011 | De Vocht | G06F 17/2715 704/9 |
| 2012/0246563 A1 * | 9/2012 | Nusbaum | G06F 17/24 715/256 |
| 2013/0124554 A1 | 5/2013 | Linyard et al. | |
| 2013/0290342 A1 * | 10/2013 | Cooper | G06F 17/2785 707/740 |
| 2013/0311166 A1 * | 11/2013 | Yanpolsky | G06F 17/30654 704/2 |
| 2013/0330008 A1 * | 12/2013 | Zadeh | G06N 7/02 382/195 |

OTHER PUBLICATIONS

PCT International Search Report and Written Opinion for Application No. PCT/US2015/029802, dated Jul. 24, 2015, 17 pgs.
Wen, "Clustering User Queries of a Search Engine", International World Wide Web Conference: Jan. 1, 2001, pp. 162-168.
Wen, "Query Clustering Using User Logs", AMC Transactions on Information Systems Association for Computing Machinery: Jan. 1, 2002, pp. 59-81.
The PCT International Preliminary Report on Patentability dated Aug. 23, 2016 for PCT application No. PCT/US2015/029802, 17 pages.
The Written Opinion of the International Preliminary Examining Authority dated May 11, 2016, for PCT application No. PCT/US2015/029802, 7 pages.

* cited by examiner

| SEARCH TERM | NEW TERM | TOKEN COUNT | ORIGINAL INTENT | CLUSTER ID |
|---|---|---|---|---|
| TEXT 1 | TERM 1 | VALUE 1 | STRING 1 | ID 1 |
| TEXT 2 | TERM 1 | VALUE 2 | STRING 1 | ID 1 |
| TEXT 3 | TERM 1 | VALUE 3 | STRING 1 | ID 1 |
| ⋮ | | | | |
| TEXT N | TERM N | VALUE N | STRING 1 | ID N |

GENERIC CLUSTER INFORMATION

IDENTIFYING QUERY INTENT

BACKGROUND

Many software products provide a relatively large number of internal functions for use while utilizing the software products to perform various tasks. For example, spell check functions within word processors, algorithm functions within spreadsheet applications, and graphical functionality for altering text in publishing applications are relatively commonplace. However, a large number of users are not familiar with many other features, functions, and tools offered in some software products.

In order to address the problem described above, some software products provide for a "help" or "query" tool that allows for users to enter an expression related to a desired task, and receive results according to the particular algorithm employed by the help or query tool. For example, a user may be permitted to enter a phrase or group of terms using natural language that describe functionality the user desires to use in the underlying software product.

In order for relevant functionality to be inferred from the phrase and subsequently returned to the user, the help or query tool must determine what matches (if any) exist between the phrase supplied by the user and pre-defined descriptions of available functionality. Furthermore, natural expressions created by any number of users must be accounted for as compared to a small group of terms used by software programmers who generate the underlying software product and descriptions of associated functionality. Accordingly, there may exist a large gap between natural language expressions used to describe desired software functions as compared to actual internal naming conventions of the desired software functions.

It is with respect to these and other considerations that the disclosure made herein is presented.

SUMMARY

Technologies are described herein for identifying query intent based on queries for discovering functions provided by a software product or group of software products. In particular, a natural language expression may be repeatedly parsed and merged based on a set of rule-based transpositions of natural language terms into one or more defined terms based on predetermined naming conventions for functions provided by the software product. Thereafter, a cluster of previous search terms related to the defined terms may be identified, and the natural language expression may be associated with the identified cluster to create intent-based cluster information.

According to one embodiment presented herein, a method for identifying query intent includes receiving a raw query directed to at least one function provided by a software product available at a computer. The raw query includes a natural language expression related to the at least one function. The method further includes repeatedly separating and merging terms of the natural language expression based on a set of rule-based transpositions of natural language terms into one or more defined terms based on predetermined naming conventions for the at least one function. The one or more defined terms may refer to the at least one function. Thereafter, the method includes identifying a cluster of previous search terms related to the one or more defined terms, and associating the natural language expression to the identified cluster to create a set of intent-based cluster information. The query intent is represented by the one or more defined terms.

According to another embodiment presented herein, a clustering system is configured to identify intent from raw queries received from a plurality of client computers for discovering functionality provided by a software product executing on the client computers. The clustering system includes at least one computer executing a raw query processing service configured to receive a raw query from at least one client computer of the plurality of client computers, correct spelling of words included in the raw query to create a spell-corrected query, override corrected spellings of a portion of the words in the spell-corrected query to create an initial grouping related to the at least one function, and group terms of the initial grouping and the spell-corrected query into a set of preliminary groupings of terms based on modifying terms in the natural language expression. The modifying terms refer to a task using the at least one function.

The raw query processing service may be further configured to separate and merge individual groupings of the set of preliminary groupings based on rule-based transpositions of natural language terms into refined groupings of terms based on predetermined naming conventions for the at least one function, the refined groupings of terms referring to the at least one function, identify a cluster of previous search terms related to the refined groupings of terms, associate the natural language expression to the identified cluster to create a set of intent-based cluster information, receive a new raw query containing at least one phrase, and compare the at least one phrase to the intent-based cluster information to identify an associated cluster of previous search terms.

It should be appreciated that the above-described subject matter may also be implemented as a computer-controlled apparatus, a computer process, a computing system, or as an article of manufacture such as a computer-readable medium. Although the embodiments presented herein are primarily disclosed in the context of identifying query intent, the concepts and technologies disclosed herein might also be utilized to decipher intent from other user submitted data. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for determining the intent of user-submitted queries for features, functions, and/or tools provided by a software product, or a set of software products. Through the use of the technologies and concepts presented herein, relatively accurate identification of intent is possible such that appropriate results may be provided for a variety of natural-language queries, such as user queries for discovering functionality provided by a computer program.

As discussed briefly above, conventional software products may require queries to locate available functionality to be submitted in concise technical terms, using descriptions closely matching established names for functionality. Utilizing an implementation of the technologies disclosed herein, however, queries to locate available functionality may be expressed as natural language expressions from which intent may be discerned. Phrases and terms from the natural language expressions can be repeatedly parsed into individual terms, and merged into individual phrases, within the confines of one or more dictionary models, such that the intent of the phrases can be identified, clustered, and used in future searches.

As used herein, the term "dictionary model" refers to a file or construct associating a set of rule-based transpositions of natural language terms with one or more defined terms or phrases based on the internal naming conventions of one or more software products. A clustering system processes the phrases using the dictionary models to continually split and merge the phrases until one or more correct clusters of phrases related to one or more software functions is identified. The clustering system can then provide clustering information having a many-to-few representation of natural language expressions matched to a relatively small number of internal software functions.

The clustering information may be used by any software application or information retrieval system configured to receive queries, including, for example, an information retrieval system configured to receive queries from users desiring to use a software product or set of software products. Upon receiving the new or future queries, a cluster recognition algorithm or module can match the new queries to associated clusters, and provide the results for consumption by the users submitting the queries.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system and methodology for filtering electronic messages will be described.

Figure 1:
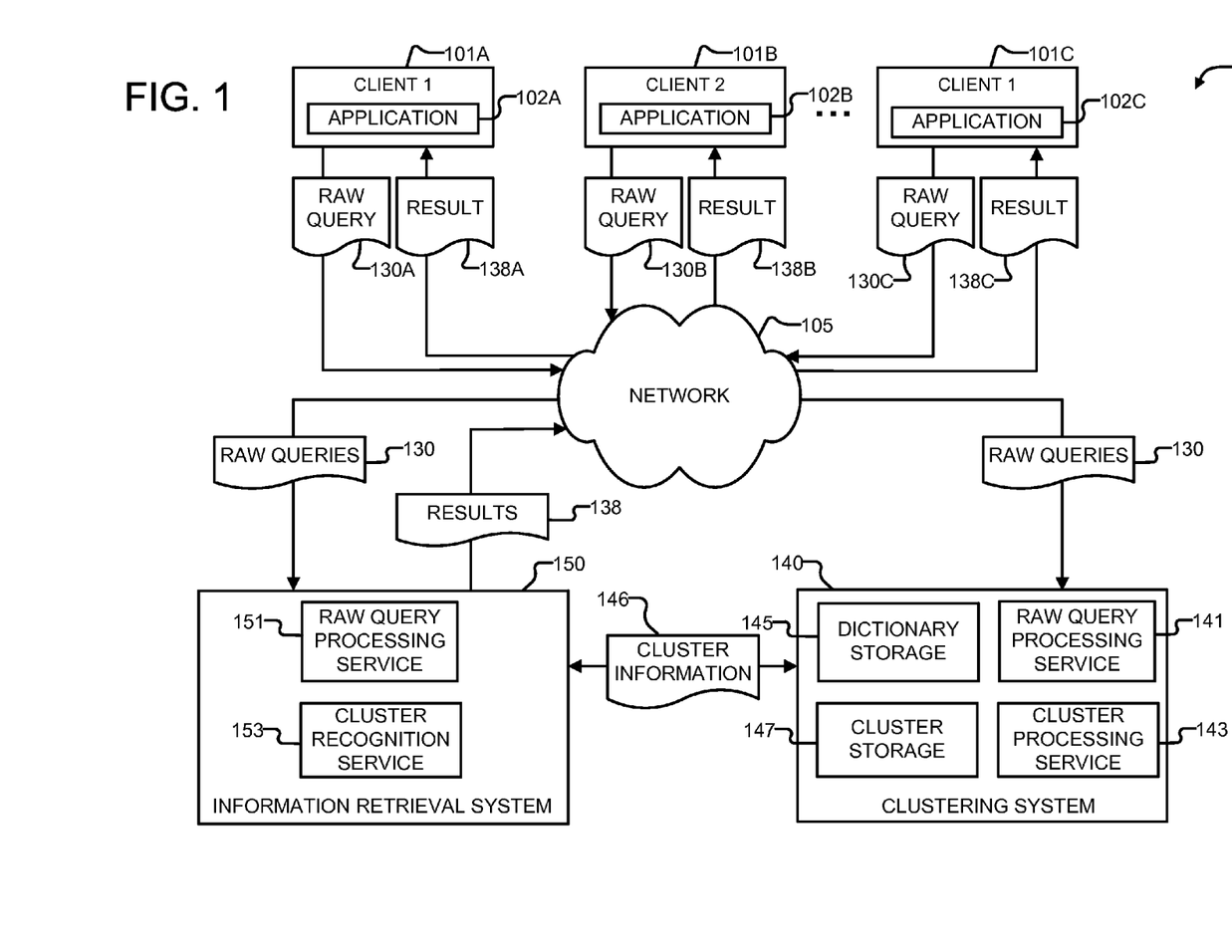
FIG. 1 is a network diagram showing aspects of an illustrative operating environment and several software components provided by the embodiments presented herein.

Turning now to FIG. 1, details will be provided regarding an illustrative operating environment and several software components provided by the embodiments presented herein. In particular, FIG. 1 shows aspects of a system 100 for determining the intent of one or more queries. The system 100 includes one or more clients 101A, 101B, and 101C (referred to herein in the singular as the "client 101" and/or in the plural as the "clients 101") in operative communication with a clustering system 140 over a network 105. The clients 101 may be any suitable computer systems including, but not limited to, desktop or laptop personal computers, tablet computing devices, smartphones, other types of mobile devices, or the like.

The clients 101 may be configured to execute software products, such as applications 102A, 102B, and 102C, or a suite of software products, that provide for user submission of queries for discovering features, functions, and tools supported by the software products. In this regard, the clients 101 may receive one or more raw queries 130A, 130B, and 130C (referred to herein in the singular as a "raw query 130" and/or in the plural as the "raw queries 130"). The raw queries 130 may include a phrase, group of terms, and/or natural language expression created by the users of the clients 101. The raw queries may be submitted for transmission over the network 105. The network 105 may include a computer communications network such as the Internet, a local area network ("LAN"), wide area network ("WAN"), or any other type of network, and may be utilized to submit the raw queries 130 to the clustering system 140 for further processing.

The clustering system 140 includes several components configured to perform processing functions as described herein related to splitting and merging groupings of natural language terms and/or phrases within the confines of dictionary models to determine the intent of a user-submitted query. For example, the clustering system 140 may be configured to receive and process the raw queries 130 through raw query processing service 141.

Generally, the raw query processing service 141 is configured to receive the raw queries 130 from the network 105. The raw query processing service 141 is further configured to determine an actual intent of the raw queries 130 through one or more dictionary models stored in dictionary storage 145, and through cluster processing at cluster processing service 143. Actual processing of the raw queries to determine intent is described in more detail with reference to FIG. 2.

Upon determining an intent of the raw queries 130, the raw query processing service 141 communicates determined intent information to cluster processing service 143, such that cluster information 146 maintained in cluster storage 147 reflects the determined intent and associated natural language expressions. It is noted that raw query processing service 141 and cluster processing service 143 may be combined in some embodiments. Therefore, any particular functionality attributed to either service may be equally attributed to the other service, and vice versa. All such modifications that provide the cluster information 147 in a useable or desired form are within the scope of this disclosure.

The cluster information 146 includes a many-to-few representation of many natural language expressions matched to a relatively small number of internal software functions. In other words, the cluster information 147 represents the intent of several raw queries as a mapping to internal software functions of target software products being executable at the clients 101. The general features and arrangement of cluster information 146 is described more fully below with reference to FIG. 6.

The cluster information 146 may be communicated to an available information retrieval system 150 arranged to be in communication with the clustering system 140. The information retrieval system 150 may include any suitable information retrieval system, such as, for example, a search engine, software product help or query system, an online service provider network (e.g., online help or information provider), or any other desired system.

The information retrieval system 150 generally includes a raw query processing service 151 arranged to receive raw queries 130, and a cluster recognition service arranged to generate search results 138 based on the raw queries 130. The raw query processing service 151 may parse and separate natural language expressions from the raw queries 130 into any desired grouping. Thereafter, the cluster recognition service 153 may utilize the parsed queries to determine if any clusters described in the cluster information 146 match one or more of the parsed groupings.

If a match is found, the cluster recognition service 153 may generate search results 138 and direct the search results 138 to appropriate client 101 (i.e., the client that generated the query) via the network 105. The network 105 may distribute the search results 138 as individual search results 138A, 138B, and 138C directed towards individual clients 101A, 101B, and 101C, respectively. It is understood that more or fewer search results can be distributed, or those search results can be distributed differently, than those forms particularly illustrated depending upon where the raw queries 130 originate.

Figure 2:
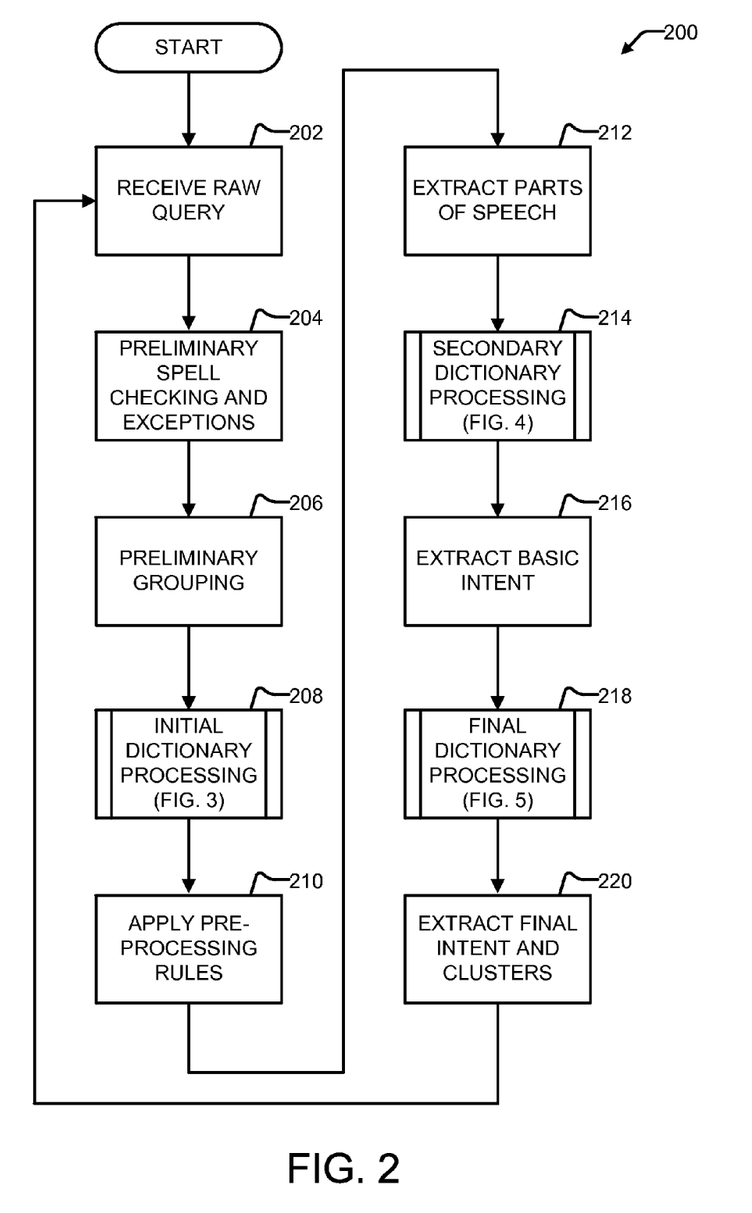
FIG. 2 is a flowchart showing aspects of one illustrative routine for pre-processing of raw user queries, according to one embodiment presented herein.

Referring now to FIG. 2, additional details will be provided regarding the embodiments presented herein for extracting intent from raw queries 130 through the clustering system 140. In particular, FIG. 2 is a flowchart showing aspects of one illustrative method 200 for processing of raw queries 130, according to one embodiment presented herein. As illustrated, the method 200 includes receiving a raw query at block 202.

As discussed briefly above, the raw query processing service 141 receives one or more raw queries 130 over a network or other communication medium. Raw queries 130 may be processed individually or in a substantially parallel process, depending upon any particular implementation. Accordingly, multiple forms of raw query processing are within the scope of this disclosure, despite the following features being described in reference to a single raw query 130.

The method 200 further includes preliminary spelling checking and exception processing of the received raw query 130 at block 204. For example, a spell-checking algorithm may be initially performed to correct any terms misspelled within the raw query 130. The spell-checking algorithm may include any known or desired algorithm that compares individual terms to determine if misspellings are apparent. The spell-checking algorithm may correct any misspellings according to its individual routine, and return results including any corrected terms.

Thereafter, spelling exception processing may be performed based on a spelling exception dictionary model to further correct terms. For example, although particular terms may be spelled correctly in natural language, one or more terms may actually refer to, or be intended to refer to, internal software functions with somewhat similar spellings. The spelling exception dictionary model is arranged to correct these incorrect references based on internal naming conventions of a target software product. For example, although a typical spell-checking algorithm may determine the term "pain" is a correctly spelled term, the raw query 130 may actually be referring to a "pane" or "tool pane" of a word processing software product such as the MICROSOFT WORD word processing program from MICROSOFT CORPORATION.

Accordingly, the spelling exception dictionary model utilized in embodiments disclosed herein may be configured to normalize (e.g., standardize) the spell-corrected natural language in the raw query 130 to be in line with the target software product executing on a client 101. An example set of transposition rules which may be included in an exemplary spelling exception dictionary model is provided in Table 1, below:

TABLE 1

| Original Term | Transposed Term |
| --- | --- |
| picot table | pivottable |
| picot tables | pivottable |
| pivioit table | pivottable |
| piviottable | pivottable |
| piviout table | pivottable |
| pivital table | pivottable |
| pivitotable | pivottable |
| pivital table | pivottable |
| pivitol table | pivottable |
| pivitottable | pivottable |

As shown above in Table 1, a number of terms can be transposed within the raw query 130 to refer to actual software functions rather than their natural language definition. In the particular example of Table 1, several different versions of natural language expressions which refer to a "pivottable" function of a target software product are transposed to the term "pivottable". The transposition may include actual swapping of the terms in the raw query 130, or the addition of metadata describing the transposition, according to any desired implementation. In this manner, the spelling exception dictionary model allows for a basic grouping of terms to be created based on the transposed terms. It is noted that varying forms of a spelling exception dictionary are applicable based upon any desired target software product, and accordingly, all such variations are within the scope of this disclosure.

The method 200 further includes preliminary grouping of the results from block 204, at block 206. Generally, the raw query processing service 141 may process the spell-corrected and spelling exception transposed query into a set of preliminary term groupings based on a modifier or modifying language within the original raw query. A modifier term may include "where" and "how," or other modifying terms, to refer to a location or process by which to complete a task using a target software product. Other modifying terms referring to temporal relationships (e.g., "when") or relationships not immediately recognizable as related to a desired function may be grouped together.

Accordingly, the raw query processing service 141 may initially group the spell-corrected and spelling exception transposed query based on the existence of these modifying terms. The initial groupings may be further processed through additional dictionary models to extrapolate additional details regarding an intent of the raw query 130.

The method 200 further includes initial dictionary model processing of the preliminarily groupings at block 208. For example, the initial dictionary model processing may include processing through several initial dictionary models somewhat similar to the spelling exception dictionary model described above. The initial dictionary model processing may result in further differentiated or split groupings such that some phrases are differentiated, synonyms are recognized or removed, tokenized or tokenizable terms are recognized, and/or unimportant words are removed. The initial dictionary processing is described in more detail with reference to FIG. 3 below.

Upon at least partial successful completion of initial dictionary model processing at block 208, the method 200 further includes applying pre-processing rules to the results from block 208, at block 210. For example, pre-processing rules may describe merging and separating terms included in the results of block 208 to form groupings more closely related to functionality of a target software product.

The pre-processing rules may be utilized in an attempt to organize individual or previously separated terms into merged phrases relating to actual functions of a target software product executing on a client 101. For example, a pre-processing rule may include merging terms such as "print" and "all" into phrases that relate to printing functions where all pages of a document are printed, such as "print-all" or "print all pages" depending upon the structure of the raw query 130 and placement of these terms in the raw query 130. Other non-limiting examples include merging terms such as "print," "every," and "other" into phrases related to segmented printing functions such as "print every other page" or "skip printing odd pages" depending upon the structure of the raw query 130 and placement of these terms in the raw query 130.

The method 200 further includes extracting parts of speech from the pre-processed groupings at block 212. As described above, the pre-processed groupings may include individual term groupings and individual phrase groupings processed from the raw query 130. The raw query processing service 141 may analyze these groupings to extra parts of speech, for example, using any available application or service for extracting parts of speech.

Generally, parts of speech may be organized as nouns, pronouns, adjectives, verbs, adverbs, prepositions, conjunctions, and interjections. Readily available tools for extracting parts of speech may include, for example, the Statistical Parsing and Linguistic Analysis Toolkit ("SPLAT") available from MICROSOFT. The output of any such tool may be processed to group identified parts of speech and remove the grouped parts of speech from prior groupings.

Thereafter, the method 200 includes secondary dictionary processing on the grouping results from block 212, at block 214. The raw query processing service 141 may, for example, process the grouping results of block 212 through several secondary dictionary models somewhat similar to the spelling exception dictionary model and initial dictionary models described above. The secondary dictionary model processing may result in further merged groupings such that some terms are subject to lemmatization, light verbs are recognized, extracted parts of speech are subjected to override dictionary model processing, and/or adjective-verb exceptions are merged. The secondary dictionary processing is described in more detail with reference to FIG. 4 below.

The method 200 further includes extracting a basic intent for the received raw query 130, from the processed groupings, at block 216. The raw query processing service 141 may perform a rule-based extraction of a basic or primary intent of the raw query 130 based upon the results of block 214. The rule-based extraction essentially extracts a verb-noun set as basis for intent. For example, rules of the rule-based extraction may be based on one or more factors such as parts of speech, position of each part of speech in a larger phrase or the raw query 130, and the sequence of the parts of speech.

The method 200 further includes final dictionary processing based on the extracted basic intent and the processed groupings, at block 218. The raw query processing service 141 may, for example, process the grouping results of block 216 through several final dictionary models somewhat similar to the spelling exception dictionary model, initial dictionary models, and secondary dictionary models described above. The final dictionary model processing may result in further merged or differentiated groupings such that phrases or terms related to actual clusters are identified and/or application-specific phrases based on the target software product are identified. The final dictionary processing is described in more detail with reference to FIG. 5 below.

Upon successful final dictionary processing by the raw query service 141, the method 200 concludes by extracting a final intent for the received raw query, from the results of block 218, at block 220. Generally, the results of block 218 may be processed by clustering service 143 to determine a final intent based on previously determined clusters representative of intent.

The clustering service 143 may associate particular groupings partially matching known clusters with the known clusters. For example, raw queries 130 containing the phrase "insert object" may be associated with a cluster representing software functions for inserting objects. Further differentiation may occur based on the number or size of the final groupings, and a threshold-based comparison may occur to determine the most likely candidate for an intent of the raw query.

Upon successful association with a known cluster, the cluster information 146 is updated to reflect the association. Thereafter, the cluster information 146 may be maintained at the cluster storage 147 and/or transmitted to information retrieval system 150. Additionally, the raw query processing service 141 and cluster processing service 143 may continually iterate through blocks 202-220 as new raw queries are retrieved, received, or otherwise created.

As described above, the term "dictionary model" refers to a file or construct associating a set of rule-based transpositions of natural language terms with one or more defined terms or phrases based on the internal naming conventions of one or more target software products. Furthermore, the term "target software product" refers to a software product installed or arranged to execute on a client 101 for which a user has submitted a raw query. As such, each dictionary model described herein may be arranged differently to achieve a desired result for a particular target software product, namely, through rules for splitting or merging groups of terms as associated with one or more clusters.

Upon final dictionary processing as described above, the final groupings of terms will reflect an associated intent of the original raw query within the confines of the one or more target software products. Thus, as new queries are received which are readily matched to provided cluster information 146, further identification of intent may be performed through a simple cluster recognition algorithm (e.g., cluster recognition service 153) configured to find a match within the cluster information 146 of the raw queries 130 within or above a predetermined threshold. However, further splitting and merging of clusters representative of the above-described software functions can occur continually, or in a batch-style set of operations, as necessary. A more detailed discussion of use of the cluster information 146 produced at the clustering system 140 is provided below with reference to FIG. 7.

Hereinafter, several examples of initial, secondary, and final dictionary processing and associated dictionary models are provided with reference to FIGS. 3-5. It should be understood that although described using the terms "initial," "secondary, and "final," that the particular order of processing or dependencies between dictionary models may be re-arranged without departing from the scope of this disclosure.

Figure 3:
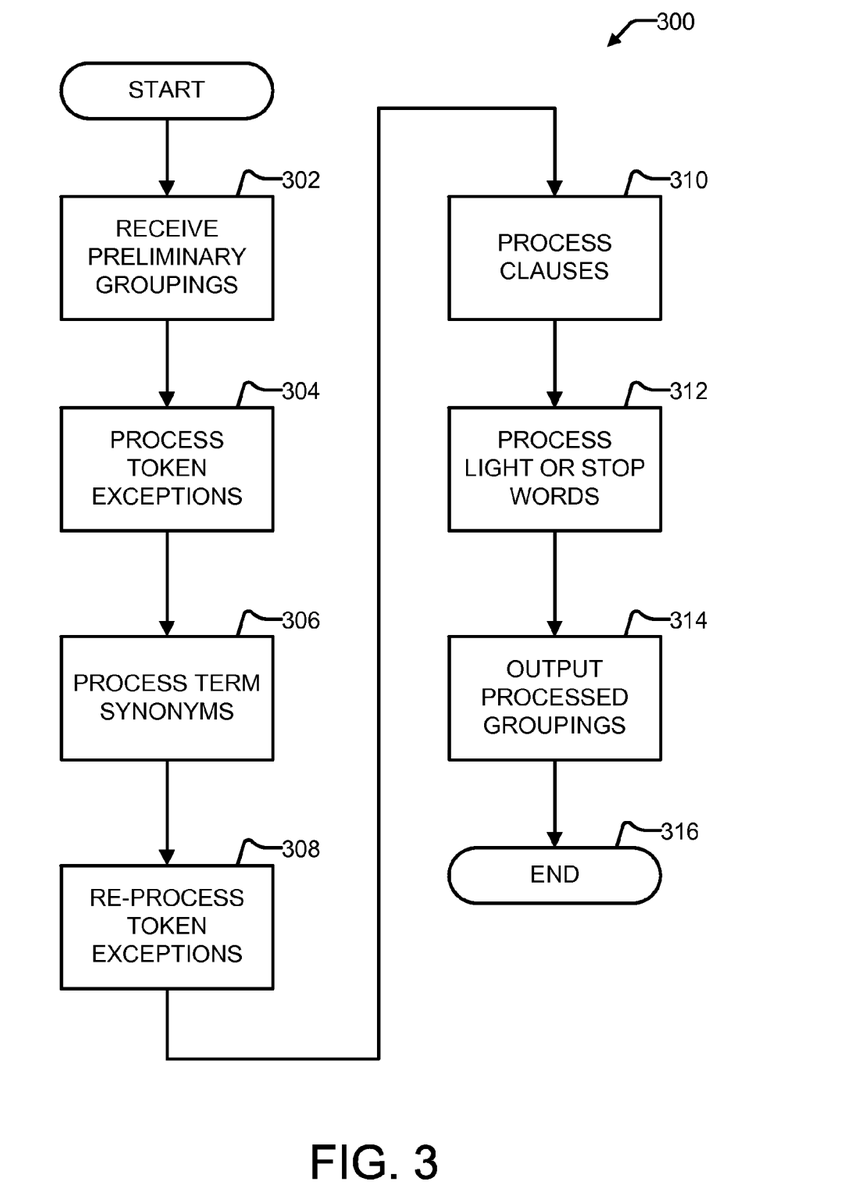
FIG. 3 is a flowchart showing aspects of one illustrative routine for dictionary processing of preliminarily grouped queries, according to one embodiment presented herein.

Turning to FIG. 3, a flowchart showing aspects of one illustrative method 300 for initial dictionary model processing of preliminarily grouped queries is illustrated, according to one embodiment presented herein. As shown, the method 300 includes receiving preliminary groupings from block 208, at block 302. For example, the preliminary groupings of block 206 may be received for initial dictionary model processing.

The method 300 further includes processing token exception groupings on the received preliminary groupings, based on a token exception dictionary model, at block 304. The token exception dictionary model may be arranged as a number of phrases or terms that should remain associated together, thereby limiting their separation.

Accordingly, the token exception dictionary model maintains the structure of some phrases in the raw query 130 such that they are more closely associated with internal naming of functions for the target software product. An example set of token rules which may be included in an exemplary token exception dictionary model is provided in Table 2, below:

TABLE 2

| Maintain Phrase |
| --- |
| general format |
| text format |
| percent style |
| percent format |
| accounting format |
| accounting style |
| currency style |
| currency styles |
| comma separated value |
| portable document format |

As shown above in Table 2, a number of phrases may be related to internal software functionality, and should therefore be maintained as singular phrases within the raw query 130. It is noted that varying forms of a token exception dictionary are applicable based upon any desired target software product, and accordingly, all such variations are within the scope of this disclosure.

The method 300 further includes processing term synonym groupings on the results of block 304, based on a term synonym dictionary model, at block 306. The term synonym exception dictionary model may be arranged as a number of phrases or terms which are better suited to being replaced by one or more synonyms more closely related to a target software product.

Accordingly, the term synonym exception dictionary model replaces a portion of the terms in the raw query 130 to be in line with the terms associated with the target software product. An example set of transposition rules which may be included in an exemplary term synonym exception dictionary model is provided in Table 3, below:

TABLE 3

| Original Term | Transposed Term |
| --- | --- |
| drop-down | drop-down list |
| drop-downs | drop-down list |
| drop list | drop-down list |
| drop menu | drop-down list |
| drop-down menu | drop-down list |
| pick list | drop-down list |
| pull list | drop-down list |
| pull-list | drop-down list |
| pull-down list | drop-down list |
| pull-down box | drop-down list |

As shown above in Table 3, a number of phrases may be related to singular terms associated with internal software functionality, and should therefore be replaced within the raw query 130. It is noted that varying forms of a term synonym exception dictionary are applicable based upon any desired target software product, and accordingly, all such variations are within the scope of this disclosure.

The method 300 further includes re-processing token exception groupings on the results of block 306, based on the token exception dictionary model, at block 308. For example, after replacing synonyms as described above, several prior phrases or groupings may have been disturbed to create individual terms which are more suited to being maintained as phrases. Accordingly, the results of block 306 may be reprocessed as described above.

Thereafter, the method 300 includes processing clause groupings on the results of block 308, based on a clause dictionary model, at block 310. The clause dictionary model may be arranged as a set of rules for replacing terms or phrases that are directed to particular clauses. For example, terms such as "if," "conditional," "shortcut" or other terms may be related to functions or may separate necessary tasks related to functions of a software product.

Accordingly, the clause dictionary model may be utilized to replace individual terms or phrases related to clauses or function descriptors in the raw query 130 to be in line with the target software product. An example set of transposition rules which may be included in an exemplary conditional term dictionary model is provided in Table 4, below:

TABLE 4

| Original Term | Transposed Term |
| --- | --- |
| if and | conditional if |
| if or | conditional if |
| if then | conditional if then |
| if then excel | conditional if then |
| if then formula | function conditional |
| if and function | function conditional |

As shown above in Table 4, a number of phrases may be related to software functions, and should therefore be replaced within the raw query 130. It is noted that varying forms of a clause dictionary are applicable based upon any desired target software product, and accordingly, all such variations are within the scope of this disclosure.

The method 300 further includes processing "light" or "stop" word groupings on the results of block 310, based on a light or stop words dictionary model, at block 312. As used herein, the terms "light" or "stop" words refer to terms or portions of phrases that can be ignored without affecting extraction of an intent of a raw query. For example, several terms within a raw query 130 may be unrelated to actual functions of a target software product, and may be ignored. An example set of terms which may be ignored are provided in Table 5, below:

TABLE 5

| Term To Ignore |
| --- |
| a |
| he |
| her |
| here |
| his |
| i |
| it |
| my |
| she |
| them |

The method 300 further includes outputting the processed groupings with ignored terms at block 314, for further processing as outlined in the method 200 of FIG. 2, and ceasing at block 316. Thereafter, additional processing may occur through the raw query processing service 141 until secondary dictionary processing is applicable.

Figure 4:
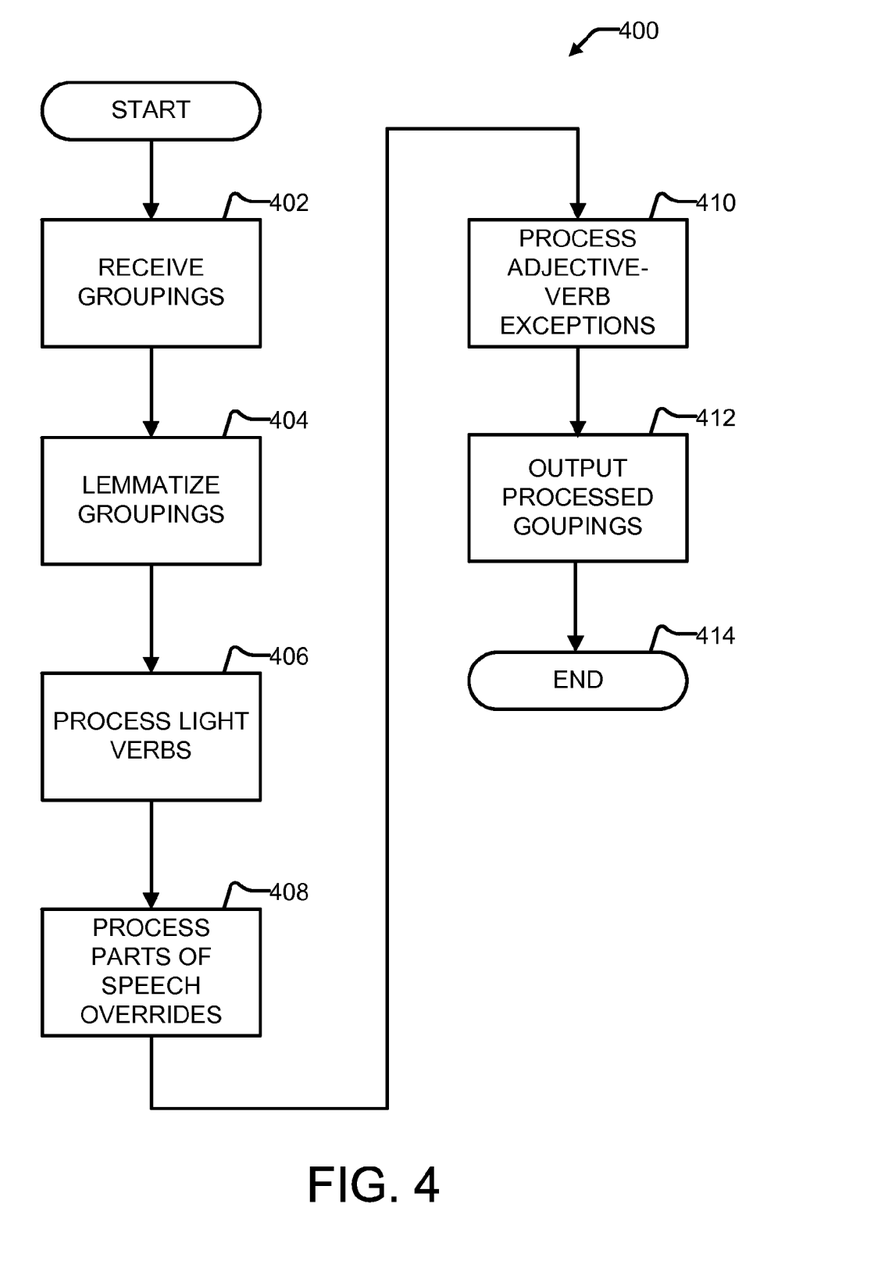
FIG. 4 is a flowchart showing aspects of one illustrative routine for secondary dictionary processing of grouped queries, according to one embodiment presented herein.

FIG. 4 is a flowchart showing aspects of one illustrative method 400 for secondary dictionary processing of grouped queries, according to one embodiment presented herein. As illustrated, the method 400 includes receiving a set of groupings from block 214, at block 402. The set of groupings may be received from block 212 after extracting parts of speech as described above.

The method 400 further includes lemmatizing the received groupings, based on a lemmatization dictionary model, at block 404. For example, several terms used in the raw query 130 may be related to a single root term. Accordingly, the lemmatization dictionary model normalizes (e.g., standardizes) the terms in the raw query 130 to singular root terms or "lemmas". An example set of transposition rules which may be included in lemmatization dictionary model is provided in Table 6, below:

TABLE 6

| Original Term | Transposed Term |
| --- | --- |
| run | run |
| runs | run |
| ran | run |
| running | run |
| shade | shade |
| shading | shade |
| shaded | shade |

As shown above in Table 6, a number of terms may be transposed to a singular lemma for simplified processing. It is noted that varying forms of a lemmatization dictionary are applicable based upon any desired target software product, and accordingly, all such variations are within the scope of this disclosure.

The method 400 further includes processing light words groupings on the lemmatized groupings, based on a light words dictionary model, at block 406. Generally, the light words dictionary model includes a variety of lightweight verbs that should not be weighed more than other verbs during processing to extract intent. As a non-limiting example, if raw query 130 includes the phrase "create a spreadsheet in excel," the light words dictionary model may weigh "excel" less than "create." Accordingly, upon processing with the light words dictionary model, the resulting groupings will include more heavily weighted verbs as compared to lightweight verbs, such as "make," "take," or "get."

The method 400 further includes processing parts of speech override groupings on the results of block 406, based on a parts of speech overrides dictionary model, at block 408. Generally, a parts of speech overrides dictionary model is arranged to correct parts of speech. For example, several terms may be inferred to be nouns by a parts of speech tool. However, these terms may be more reflective of a verb when understood in the context of a particular target software product.

Accordingly, the parts of speech overrides dictionary model transposes more appropriate parts of speech in the raw query 130 to be in line with the target software product executing on a client 101. An example set of transposition rules which may be included in an exemplary parts of speech overrides dictionary model is provided in Table 7, below:

TABLE 7

| Original Term | Part of Speech |
| --- | --- |
| group | verb |
| refresh | verb |
| filter | verb |
| export | verb |
| insert | verb |
| split | verb |
| input | verb |

As shown above in Table 7, a number of terms may be more appropriately considered verbs or other parts of speech with considered in the context of a particular software product. It is noted that varying forms of a parts of speech overrides dictionary model are applicable based upon any desired target software product, and accordingly, all such variations are within the scope of this disclosure.

The method 400 further includes processing adjective-verb exception groupings on the results of block 408, based on an adjective-verb exception dictionary model, at block 410. The adjective-verb exception dictionary model may additionally correct parts of speech issues related to using a general parts of speech extraction tool. For example, if certain adjectives immediately precede nouns in the raw query 130, it may be more appropriate to maintain a part of speech for the term rather than reduce it to a verb or noun. As a non-limiting example, if terms such as "colored," "dashed," and "printed" appear before a noun, an appropriate grouping may include a noun stack, instead of reducing "printed" to the verb "print."

The method 400 further includes outputting the processed groupings at block 412 for further processing as outlined in the method 200 of FIG. 2, and ceasing at block 414. These processed groupings may be processed to extract basic intent for the raw query 130 as outlined above. Thereafter, final dictionary processing may be performed for extraction of a final intent and clustering.

Figure 5:
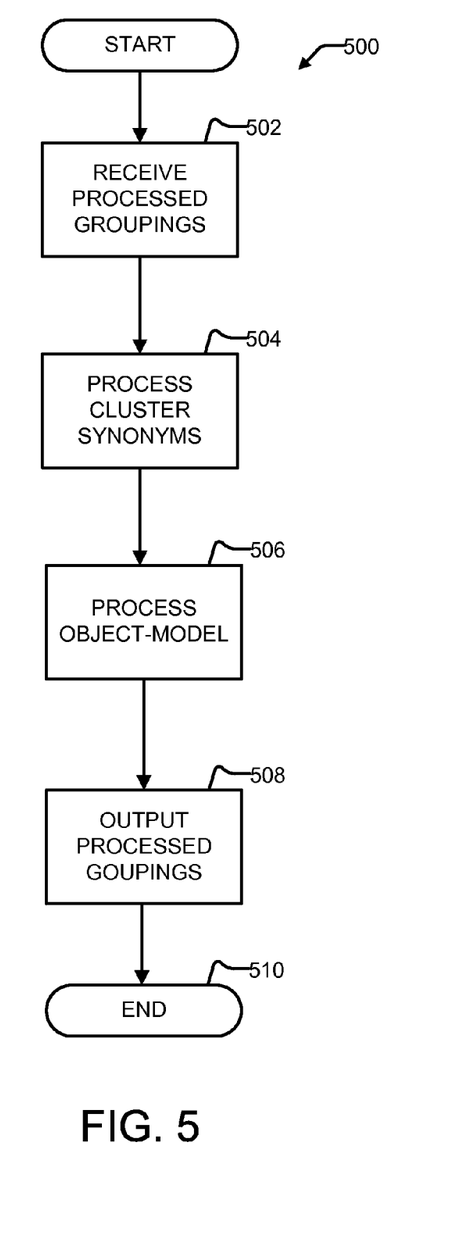
FIG. 5 is a flowchart showing aspects of one illustrative routine for final dictionary processing of grouped queries, according to one embodiment presented herein.

FIG. 5 is a flowchart showing aspects of one illustrative routine for final dictionary processing of grouped queries, according to one embodiment presented herein. As illustrated, the method 500 includes receiving a set of processed groupings from block 218, at block 502.

The method 500 further includes processing cluster synonym groupings on the received groupings, based on a cluster synonym dictionary model, at block 504. Generally, a cluster synonym dictionary model is arranged to map duplicate groups to a singular group. Accordingly, several disparate groups may be mapped to a single parent groups more reflective of the intent of the raw query 130. An example set of transposition rules which may be included in an exemplary cluster synonym dictionary model is provided in Table 8, below:

TABLE 8

| Original Group | Transposed Group |
| --- | --- |
| show in thousands | format comma |
| in thousands | format comma |
| number format thousands | format comma |
| separator thousands | format comma |
| change to thousands | format comma |
| number in thousands | format comma |
| thousands separator | format comma |
| thousands format | format comma |
| pull-down list | format comma |
| pull-down box | format comma |

As shown above in Table 8, a number of phrases or groups may be transposed to a singular group for simplified processing. It is noted that varying forms of a cluster synonym dictionary are applicable based upon any desired target software product, and accordingly, all such variations are within the scope of this disclosure.

The method 500 further includes processing object-model groupings on the results of block 504, based on an object-model dictionary model, at block 506. Generally, the object-model dictionary model is arranged as a dictionary of phrases related to at least one function of a target software product. The phrases may directly refer to individual functions, and therefore, may be representative of the intent of the raw query 130.

Accordingly, the phrases may be utilized by comparison to the processed groupings to further define the intent of a raw query 130 by attempting to match portions of the processed groupings directly. Upon matching, final intent information may be apparent. The method 500 further includes outputting the processed groupings at block 508 for further processing as outlined in the method 200 of FIG. 2, and ceasing at block 510.

Figure 6:
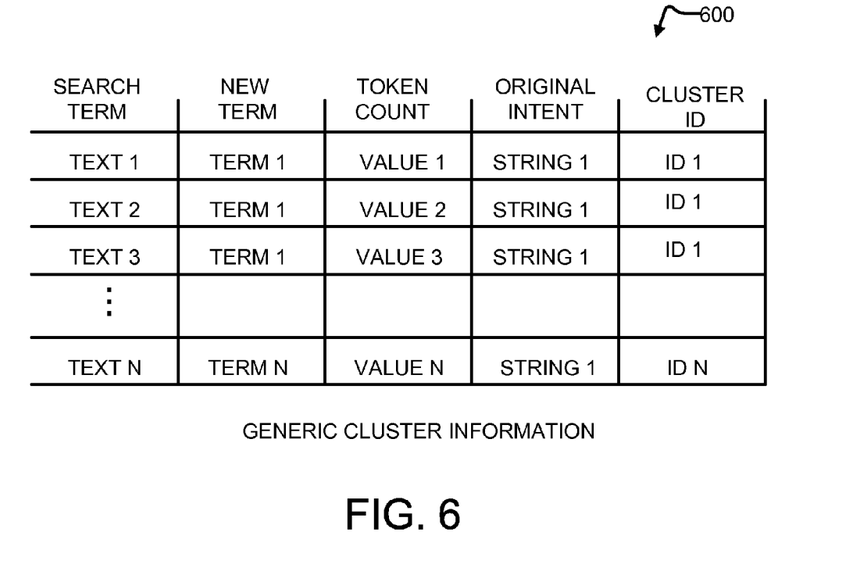
FIG. 6 is an exemplary table showing a generic output format which may be used for identification of query intent.

FIG. 6 is an exemplary table 600 showing a generic output format that may be used for identification of query intent. It is noted that the particular format of table 600 may be altered to any desired form, and thus the format illustrated is not limiting of this disclosure. Generally, table 600 may represent a generic form of cluster information 146, for use by an information retrieval system such as information retrieval system 150, a search engine system, or any other suitable system.

The table 600 includes columns organized to separate an original search term or phrase of a raw query, a more suitable new search term reflective of the intent of the raw query, a total token count of tokens in the raw query, and a cluster identification ("ID") value for identifying an established cluster. The table 600 thus presents a many-to-few mapping of several search terms TEXT 1-TEXT N associated with a new term TERM 1 representative of an original intent STRING 1, and an associated cluster identification ID 1. Although presented as a mapping to a single original intent, it should be understood that actual output representations of the cluster information 146 may include many different search terms matched to many different new terms, depending upon the target software products included in the system 100.

Figure 7:
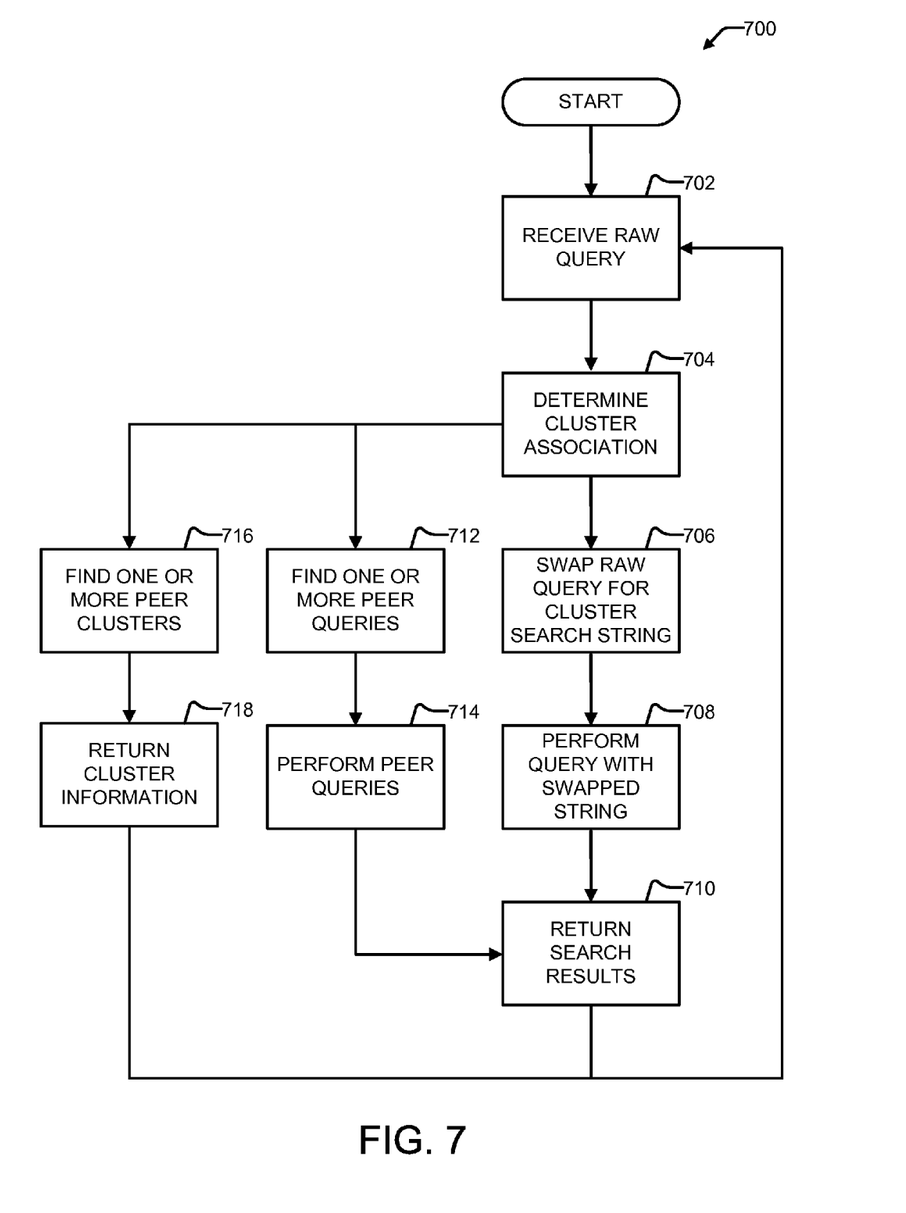
FIG. 7 is a flowchart showing aspects of one illustrative routine for processing of user queries using clustered query information, according to one embodiment presented herein.

The cluster information 146 represented similar to table 600 can be used for identification of the intent of new raw queries received during active processing of the system 100. For example, FIG. 7 is a flowchart showing aspects of one illustrative method 700 for processing of raw user queries using clustered query information, according to one embodiment presented herein As illustrated, the method 700 includes receiving a raw user query at block 702. The method 700 further includes determining a cluster association for the received raw query at block 704. For example, the cluster recognition service 153 may compare natural language from the received raw query to the cluster information 146 (or the "Search Term" column of table 600) to determine a cluster ID or cluster information.

As further illustrated, the method 700 includes several diverging options for processing of the determined cluster information. For example, the method 700 may include swapping the received raw user query search string information for the determined cluster search string, at block 706. Thereafter, the method 700 includes performing a query with the swapped string at block 708 and returning the search results at block 710.

Alternatively, the method 700 may include finding one or more "peer queries" related to the determined cluster associated at block 712. For example, a "peer query" may refer to raw queries submitted by peer users, which have a similar or at least partially related intent. Thereafter, the method 700 includes performing queries based on the peer queries at block 714, and returning the search results for one or more of the peer queries at block 710. Additionally, the method 700 may include finding one or more peer clusters related to the determined cluster information at block 716. Thereafter, the method 700 includes returning the peer cluster information at block 718.

The cluster information 146, which is representative of a fluctuating number of intents, may be useable in a variety of forms and by a variety of applications. The cluster information 146 may be generated during offline processing based on logs of user queries for several target software products. The logs may be accessed through the clustering system 140 to create and maintain the clustering information 146 as outlined above. Thereafter, the clustering information 146 may be used at an information retrieval system for faster processing of raw queries through simpler identification of intent.

It should be appreciated that the logical operations described above may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 8:
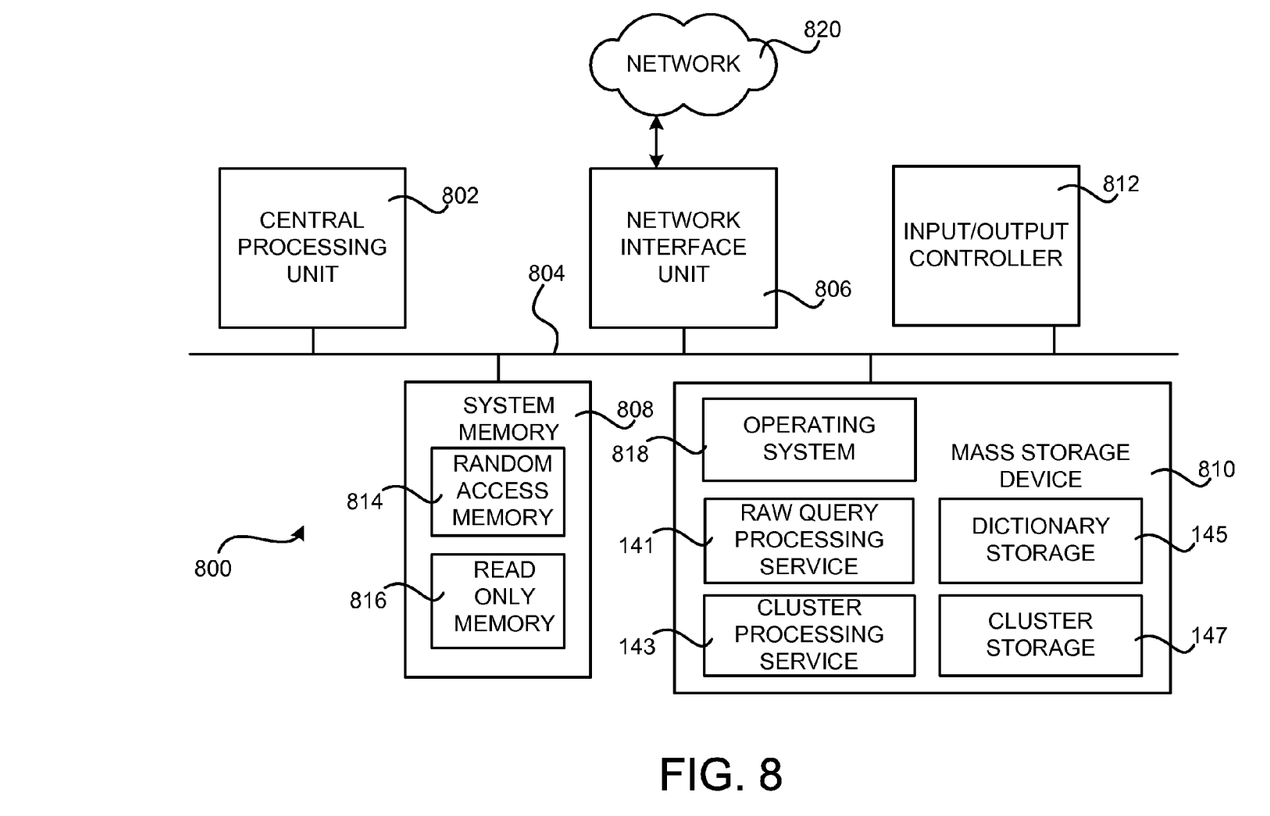
FIG. 8 is a computer architecture diagram showing an illustrative computer hardware and software architecture.

FIG. 8 shows an illustrative computer architecture for a computer 800 capable of executing the software components described herein for determining the intent of raw user queries in the manner presented above. The computer architecture shown in FIG. 8 illustrates a conventional desktop, laptop, or server computer and may be utilized to execute any aspects of the software components presented herein described as executing on the clustering system 140.

The computer architecture shown in FIG. 8 includes a central processing unit 802 ("CPU"), a system memory 808, including a random access memory 814 ("RAM") and a read-only memory ("ROM") 816, and a system bus 804 that couples the memory to the CPU 802. A basic input/output system containing the basic routines that help to transfer information between elements within the computer 800, such as during startup, is stored in the ROM 816. The computer 800 further includes a mass storage device 810 for storing an operating system 818, application programs, and other program modules, which are described in greater detail herein.

The mass storage device 810 is connected to the CPU 802 through a mass storage controller (not shown) connected to the bus 804. The mass storage device 810 and its associated computer-readable media provide non-volatile storage for the computer 800. Although the description of computer-readable media contained herein refers to a mass storage device, such as a hard disk or CD-ROM drive, it should be appreciated by those skilled in the art that computer-readable media can be any available computer storage media or communication media that can be accessed by the computer 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 800. For purposes of the claims, the phrase "computer storage medium," and variations thereof, does not include waves or signals per se and/or communication media.

According to various embodiments, the computer 800 may operate in a networked environment using logical connections to remote computers through a network such as the network 820. The computer 800 may connect to the network 820 through a network interface unit 806 connected to the bus 804. It should be appreciated that the network interface unit 806 may also be utilized to connect to other types of networks and remote computer systems. The computer 800 may also include an input/output controller 812 for receiving and processing input from a number of other devices, including a keyboard, mouse, or electronic stylus (not shown in FIG. 8). Similarly, an input/output controller may provide output to a display screen, a printer, or other type of output device (also not shown in FIG. 8).

As mentioned briefly above, a number of program modules and data files may be stored in the mass storage device 810 and RAM 814 of the computer 800, including an operating system 818 suitable for controlling the operation of a networked desktop, laptop, or server computer. The mass storage device 810 and RAM 814 may also store one or more program modules, such as the raw query processing service 141, cluster processing service 143, dictionary storage 145, and cluster storage 147, described above. The mass storage device 810 and the RAM 814 may also store other types of program modules, services, and data.

Based on the foregoing, it should be appreciated that technologies for identifying query intent provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for identifying query intent, the method comprising:
   receiving a raw query from a first user directed to discover at least one function provided by a software product available at a computer as a search output, the raw query received from the first user comprising a natural language expression related to the at least one function;
   repeatedly separating and merging terms of the natural language expression based on a set of rule-based transpositions of natural language terms into one or more defined terms based on predetermined naming conventions for the at least one function, the one or more defined terms referring to the at least one function, wherein repeatedly separating and merging terms of the natural language expression comprises grouping terms of the natural language expression into a set of preliminary groupings of terms based on modifying terms in the natural language expression, the modifying terms referring to a task using the at least one function and the set of rule-based transpositions being applied to the preliminary groupings of terms;
   identifying a cluster of groupings matching the one or more defined terms, wherein the cluster of groupings matching the one or more defined terms is associated with an intent;

associating the raw query received from the first user with the intent of the cluster groupings matching the one or more defined terms;

identifying a peer query having a similar intent as the intent associated with the raw query, the peer query including a raw query previously received from a second user; modifying the natural language expression included in the raw query received from the first user to include at least a portion of a natural language expression included in the peer query to generate a modified raw query; and generating results for the modified raw query.

2. The computer-implemented method of claim 1, wherein repeatedly separating and merging terms of the natural language expression further comprises:

repeatedly separating and merging individual groupings of the set of preliminary groupings based on the set of rule-based transpositions of natural language terms into the one or more defined terms.

3. The computer-implemented method of claim 1, wherein the set of rule-based transpositions comprise at least one of:

a rule to transpose one or more terms of the natural language expression into synonyms related to the at least one function;

a rule to transpose one or more terms of the natural language expression into clauses related to the at least one function;

a rule to transpose one or more terms of the natural language expression into root lemmas of the one or more terms; and a rule to transpose one or more terms of the natural language expression into phrases contained in the cluster of previous search terms.

4. The computer-implemented method of claim 1, wherein the set of rule-based transpositions comprise at least one of:

a rule to group at least two terms of the natural language expression as a token referring to an aspect of the at least one function; and a rule to separate a phrase of the natural language expression into one or more terms based on identification of more than one verb in the phrase.

5. The computer-implemented method of claim 1, wherein the set of rule-based transpositions comprise at least one of:

a rule to group at least two terms of the natural language expression as a phrase referring to a portion of a description of the at least one function; and a rule to remove at least one term from the natural language expression to create a phrase more closely related to the at least one function.

6. The computer-implemented method of claim 1, wherein the set of rule-based transpositions comprise at least one of:

a rule to identify parts of speech of the natural language expression; and a rule to override identified parts of speech to create a phrase more closely related to the at least one function.

7. The computer-implemented method of claim 1, wherein the set of rule-based transpositions comprise a rule to override corrected spellings of terms to create a phrase more closely related to the at least one function.

8. The computer-implemented method of claim 1, wherein identifying the cluster of previous search terms related to the one or more defined terms comprises comparing the one or more defined terms to a plurality of cluster identification information to determine a matching cluster.

9. The computer-implemented method of claim 1, wherein associating the natural language expression to the identified cluster comprises associating at least one phrase of the natural language expression to the identified cluster to create a one-to-one representation for matching of new raw queries containing the at least one phrase to the identified cluster.

10. A computer storage medium having computer executable instructions stored thereon which, when executed by a computer, cause the computer to:

receive a raw query from a first user directed to discover at least one function provided by a software product available at a computer, the raw query received from the first user comprising a natural language expression related to the at least one function and having an intent to utilize or identify the at least one function;

group terms of the natural language expression into a set of preliminary groupings of terms based on modifying terms in the natural language expression, the modifying terms referring to a task using the at least one function;

separate and merge individual groupings of the set of preliminary groupings based on rule-based transpositions of natural language terms into refined groupings of terms based on predetermined naming conventions for the at least one function, the refined groupings of terms referring to the at least one function, wherein to separate and merge individual groupings of the set of preliminary groupings comprises grouping terms of the individual groupings into a set of preliminary groupings of terms based on modifying terms in the individual groupings of the set of preliminary groupings;

identify a cluster of groupings matching the refined groupings of terms, wherein the cluster of groupings matching the refined grouping of terms is associated with an intent;

associate the raw query received from the first user with the intent of the cluster of groupings matching the refined grouping of terms;

identify a peer query having a similar intent as the intent associated with the raw query, the peer query including a raw query previously received from a second user; modify the natural language expression included in the raw query received from the first user to include at least a portion of a natural language expression included in the peer query to generate a modified raw query; and generate results for the modified raw query.

11. The computer storage medium of claim 10, wherein the set of rule-based transpositions comprise at least one of:

a rule to transpose one or more terms of the natural language expression into a grouping of synonyms related to the at least one function;

a rule to transpose one or more terms of the natural language expression into a grouping of clauses related to the at least one function;

a rule to transpose one or more terms of a grouping into root lemmas of the one or more terms; and a rule to transpose one or more terms of the natural language expression into a grouping contained in the cluster of previous search terms.

12. The computer storage medium of claim 10, wherein the set of rule-based transpositions comprise at least one of:

a rule to group at least two terms of the natural language expression as a token grouping referring to an aspect of the at least one function; and a rule to separate a grouping into one or more smaller groupings based on identification of more than one verb in the grouping.

13. The computer storage medium of claim 10, wherein the set of rule-based transpositions comprise at least one of:
    a rule to group at least two terms of the natural language expression as a grouping referring to a portion of a description of the at least one function; and
    a rule to remove at least one term from another grouping to create a grouping more closely related to the at least one function.

14. The computer storage medium of claim 10, wherein the set of rule-based transpositions comprise at least one of:
    a rule to identify parts of speech of the natural language expression; and
    a rule to override identified parts of speech to create a grouping more closely related to the at least one function.

15. The computer storage medium of claim 10, wherein the set of rule-based transpositions comprise a rule to override corrected spellings of terms in the groupings to create a grouping more closely related to the at least one function.

16. The computer storage medium of claim 10, wherein identify the cluster of previous search terms related to the refined groupings of terms comprises comparing the refined groupings of terms to a plurality of cluster identification information to determine a matching cluster.

17. The computer storage medium of claim 10, wherein associate the natural language expression to the identified cluster comprises associating at least one grouping of the refined groupings to the identified cluster to create a one-to-one representation for matching of new raw queries containing terms of the at least one grouping to the identified cluster.

18. The computer storage medium of claim 10, having instructions to further cause the computer to:
    receive a new raw query containing at least one phrase;
    compare the at least one phrase to the intent-based cluster information to identify an associated cluster of previous search terms; and
    return the identified associated cluster as a result for the new raw query.

19. A clustering system configured to identify intent from raw queries received from a plurality of client computers directed to at least one function provided by a software product, the system comprising:
    at least one computer executing a raw query processing service configured to receive a raw query from a first client computer of the plurality of client computers to discover at least one function provided by a software product available at the first client computer,
    correct spelling of words included in the raw query to create a spell-corrected query,
    override corrected spellings of a portion of the words in the spell-corrected query to create an initial grouping of overridden corrected spellings related to the at least one function,
    group terms of the initial grouping and the spell-corrected query into a set of preliminary groupings of terms based on modifying terms in the natural language expression, the modifying terms referring to a task using the at least one function, separate and merge individual groupings of the set of preliminary groupings based on rule-based transpositions of natural language terms into refined groupings of terms based on predetermined naming conventions for the at least one function, the refined groupings of terms referring to the at least one function,
    identify a cluster of groupings matching the refined groupings of terms, wherein the cluster of groupings matching the one or more defined terms is associated with an intent,
    associate the raw query received from the first client computer with the intent of the cluster of groupings matching the one or more defined terms,
    identify, a peer query having a similar intent as the intent associated with the raw query, the peer query including a raw query previously received from a second client computer, modify the natural language expression included in the raw query received from the first client computer to include at least a portion of a natural language expression included in the peer query to generate a modified raw query,
    generate results for the modified raw query,
    receive a new raw query containing at least one phrase, and
    compare the at least one phrase to the intent-based cluster information to identify an associated cluster of previous search terms.

* * * * *